United States Patent [19]

Sisson

[11] Patent Number: 5,252,614

[45] Date of Patent: * Oct. 12, 1993

[54] PROCESS FOR SEPARATING POLYETHYLENE TEREPHTHALATE FROM POLYVINYL CHLORIDE

[75] Inventor: Edwin A. Sisson, Fairlawn, Ohio

[73] Assignee: Shell Oil Company, Houston, Tex.

[*] Notice: The portion of the term of this patent subsequent to Jun. 9, 2009 has been disclaimed.

[21] Appl. No.: 805,172

[22] Filed: Dec. 11, 1991

Related U.S. Application Data

[63] Continuation-in-part of Ser. No. 697,857, May 9, 1991, Pat. No. 5,120,768.

[51] Int. Cl.$^5$ .............................. B03B 1/00
[52] U.S. Cl. ............................... 521/46.5; 521/48; 521/48.5; 523/129; 528/489; 528/494
[58] Field of Search ........... 521/46.5, 48, 48.5; 523/129; 528/489, 494

[56] References Cited

U.S. PATENT DOCUMENTS

| | | | |
|---|---|---|---|
| 3,703,488 | 11/1972 | Morton | 260/23 |
| 3,925,200 | 12/1975 | Izumi et al. | 209/9 |
| 3,985,650 | 10/1976 | Saitoh et al. | 210/44 |
| 4,046,677 | 9/1977 | Saitoh et al. | 209/166 |
| 4,119,533 | 10/1978 | Saitoh et al. | 209/155 |
| 4,132,633 | 1/1979 | Saitoh et al. | 209/9 |
| 4,617,111 | 10/1986 | Grimm et al. | 521/46.5 |
| 4,629,780 | 12/1986 | Schoenhard | 521/48 |
| 5,120,768 | 6/1992 | Sisson | 521/46.5 |

FOREIGN PATENT DOCUMENTS 1444831  5/1974  United Kingdom .

*Primary Examiner*—Paul R. Michl
*Assistant Examiner*—Andrew E. C. Merriam
*Attorney, Agent, or Firm*—Douglas Baldwin

[57] ABSTRACT

This invention reveals a process for recovering polyethylene terephthalate flakes from a recycle stream containing polyethylene terephthalate flakes and polyvinyl chloride flakes which comprises: (1) treating the recycle stream with (a) at least one inorganic base selected from the group consisting of sodium hydroxide and potassium hydroxide and (b) at least one nonionic surfactant under conditions and for a time sufficient to decrease the contact angle of the polyethylene terephthalate flakes with water below a value of 25° while maintaining the contact angle of the polyvinyl chloride flakes above a value of about 45°; (2) adding the treated recycle stream to water, to form an aqueous mixture containing the treated polyethylene terephthalate flakes and treated polyvinyl chloride flakes; (3) agitating the aqueous mixture to allow the polyvinyl chloride flakes to come in contact with gas bubbles; (4) allowing the polyvinyl chloride flakes to float to the surface of the aqueous mixture and allowing the polyethylene terephthalate flakes to sink to the bottom of the aqueous mixture; and (5) removing the polyvinyl chloride flakes from the surface of the aqueous mixture and removing the polyethylene terephthalate flakes from the bottom of the aqueous mixture.

18 Claims, No Drawings

PROCESS FOR SEPARATING POLYETHYLENE TEREPHTHALATE FROM POLYVINYL CHLORIDE

This is a continuation-in-part of application Ser. No. 07/697,857, filed on May 9, 1991, now U.S. Pat. No. 5,120,768.

BACKGROUND OF THE INVENTION

In 1989 approximately 700 million pounds of polyethylene terephthalate (PET) were consumed to produce soft drink bottles. Presently about 28% of this material is recycled with the remainder being placed in landfills or incinerated. Due to problems with overloaded landfills and the negative environmental image plastics has received recently, bills have been introduced aimed at establishing bottle deposits and the number of curbside recycling programs has increased tremendously. The collection of PET bottles through these programs has resulted in a source of post-consumer PET which has been used for a number of applications. Generally these applications involve the conversion and fabrication of the post-consumer PET into materials of lower value. Examples of such applications are polyols for unsaturated polyesters or polyurethanes, fiberfill, carpet fibers, and strapping. Recycled PET is also blended with other materials such as polybutylene terephthalate, polycarbonate, or glass fibers, etc., for automotive as well as other engineering applications.

Post-consumer PET can also be recycled into resin which can be used in manufacturing containers for foods and beverages, such as carbonated beverage bottles. In such a procedure, the post consumer PET is depolymerized to oligomers which are subsequently utilized as a raw material in the preparation of the recycled PET resin. Such a procedure for depolymerizing PET is described in U.S. Pat. No. 3,703,488.

It is, of course, necessary to separate the post-consumer PET from other plastics in the recycling procedure. For instance, polyvinyl chloride (PVC) is often present in sources of post-consumer PET. PVC presents a particular problem in that it is a clear plastic material which is sometimes misidentified as PET and in conventional processes the separation of PVC from PET is difficult, if not impossible. In any case, sources of post-consumer PET are often contaminated with PVC.

PET articles which are being recycled are typically ground into flakes for further processing. For instance, PET beverage bottles are typically ground into flakes which have a cross-sectional area of from about 4 mm$^2$ to about 100 mm$^2$. It is more typical for such flakes to have an area of about 15 mm$^2$ to about 65 mm$^2$. The thickness of the flakes varies with the wall thickness of the bottles which are being recycled.

Because post-consumer PET sources are often contaminated with PVC, recycle streams of PET flakes also generally contain PVC flakes. It is important to remove these PVC flakes from the PET flakes in the recycle stream to allow for further steps in the recycling operation. However, the removal of the PVC flakes from the PET flakes in the recycle stream has not proven to be straight forward. For instance, PVC generally has a density which is close to the density of PET. This renders flotation separation techniques which are based upon density differences of the flakes virtually impossible.

U.S. Pat. No. 4,064,677 discloses a technique for separating various plastics by an aqueous flotation procedure. In the procedure described in U.S. Pat. No. 4,064,677, the less wettable plastic floats to the surface of the aqueous medium by virtue of the fact that a greater number of gas bubbles adhere to its surface. However, PET and PVC have contact angles which are relatively close to one another. This problem is compounded by the fact that the contact angle of PVC can vary considerably based upon the manner in which it was compounded. Because the contact angle of compounded PVC is close to the contact angle of PET, separation based upon a differential density and wettability is extremely difficult without conditioning the PVC and PET in accordance with this invention.

SUMMARY OF THE INVENTION

This invention is based upon the unexpected finding that a recycle stream containing PET flakes and PVC flakes can be conditioned to reduce the contact angle of the PET flakes to a value of less than 25° while maintaining the contact angle of the PVC flakes above a value of about 45°. Such a differential in contact angles makes it possible to separate the PVC flakes from the PET flakes by selective adherence of gas bubbles to the PVC which is based upon the differential wettability between the PET and PVC. This requires prior conditioning of the recycle stream containing the PET flakes and the PVC flakes with (a) at least one inorganic base selected from the group consisting of sodium hydroxide and potassium hydroxide and (b) at least one nonionic surfactant.

The subject invention more specifically relates to a process for recovering polyethylene terephthalate flakes from a recycle stream containing polyethylene terephthalate flakes and polyvinyl chloride flakes which comprises: (1) washing the recycle stream with an aqueous solution of at least one base; (2) recovering the washed recycle stream from the aqueous solution; (3) treating the recovered recycle stream with at least one nonionic surfactant under conditions and for a time sufficient to decrease the contact angle of the polyethylene terephthalate flakes below a value of 25° while maintaining the contact angle of the polyvinyl chloride flakes above a value of about 45° to form an aqueous mixture containing the treated polyethylene terephthalate flakes and treated polyvinyl chloride flakes; (4) agitating the aqueous mixture to allow the polyvinyl chloride flakes to come in contact with gas bubbles; (5) allowing the polyvinyl chloride flakes to float to the surface of the aqueous mixture and allowing the polyethylene terephthalate flakes to sink to the bottom of the aqueous mixture; and (6) removing the polyvinyl chloride flakes from the surface of the aqueous mixture and removing the polyethylene terephthalate flakes from the bottom of the aqueous mixture.

DETAILED DESCRIPTION OF THE INVENTION

The recycle streams utilized in practicing this invention contain PET flakes and PVC flakes. However, other plastics such as high density polyethylene, low density polyethylene, polypropylene, and ethylene vinyl acetates can also be present in the recycle stream. The PET in the recycle stream is typically comprised of repeat units which are derived from terephthalic acid or a diester thereof and ethylene glycol. However, it is understood that the PET can also be modified with small amounts of other monomers. Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of such a modified PET. For instance, a small amount of 1,4-butane diol can be utilized in the glycol component used in preparing the modified PET. Normally, no more than about 5 weight percent of the repeat units in such modified PET will be comprised of diacids or diols other than a terephthalic acid and ethylene glycol. It is, of course, contemplated that diesters of such dicarboxylic acids and diols can also be used. In most cases, such modified PET will contain less than about 3% diacids other than terephthalic acid and less than 3% diols other than ethylene glycol. Such modified polyesters most typically contain only about 1% dicarboxylic acids other than terephthalic acid and/or less than 1% glycols other than ethylene glycol. Polyethylene isophthalate and copolymers thereof will also normally be in the recycle feed stream and are considered to be PET for the purposes of this invention.

The PVC in the recycle feed stream is primarily derived from PVC compounded into bottles and containers. The PVC can contain thermal stabilizers such as organo metallic salts, epoxides, and phosphite chelators and other additives such as lubricants (waxes, fatty esters and fatty soaps of metallic acids), plasticizers (phthalate esters, adipates, azelates and organic phosphate esters and epoxidized oils), impact modifiers (elastomeric polymers), process aids (methyl methacrylate copolymers or styrene-acrylonitrile copolymers), fillers and primary pigments (organic and inorganic). Other additives may include ultra-violet light stabilizers, antidegradants, fungicides, anti-static agents and anti-blocking agents.

The PET and PVC flakes in the recycle stream will normally have a cross-sectional area which is within the range of about 4 mm$^2$ to about 100 mm$^2$. It is more typical for such flakes to have an area of about 15 mm$^2$ to about 65 mm$^2$. The thickness of the flakes will, of course, vary with the thickness of the article which was ground for recycling. In most cases, the flake will be from ground bottles or containers. The PET flakes in the recycle stream will come primarily from PET beverage bottles which have a standard wall thickness of about 0.028 inches (0.711 mm). Accordingly, the flake will generally have a thickness which is on the order of 0.025 to 0.030 inches (0.64 mm to 0.76 mm). However, the neck and finish (threads) regions of the bottle will typically be of substantially greater thickness. Accordingly, flakes which are derived from the neck and finish regions of bottles will be considerably thicker.

The first step in the practice of this invention involves treating the recycle stream containing the PET flakes and PVC flakes in a conditioning step. In this conditioning step, the recycle stream is treated in an aqueous medium with (a) at least one inorganic base selected from the group consisting of sodium hydroxide and potassium hydroxide and (b) at least one nonionic surfactant under conditions and for a time sufficient to decrease the contact angle of the polyethylene terephthalate flakes below a value of 25° while maintaining the contact angle of the polyvinyl chloride flakes above a value of about 45°. Preferably, this conditioning step will result in the contact angle of the PET flakes being reduced to a level of less than about 15° with the contact angle of the PVC flakes being increased to a value of greater than about 50°. It is most preferred for the conditioning step to result in the contact angle of the PET flakes being reduced to a value of less than about 5° with the contact angle of the PVC flakes being increased to a value of greater than about 55°.

The contact angle is the measurement of the angle formed between a solid substrate and a drop of liquid on its surface. The contact angles referred to herein were measured with a rame-hart Model 100 Goniometer System.

Any type of nonionic surfactant can be employed in the conditioning step. For instance, the nonionic surfactant can be a polyol which is a copolymer of ethylene oxide and propylene oxide. Such polyols have the structural formula:

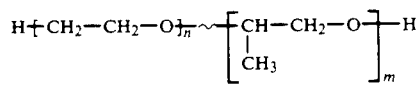

wherein n and m are integers, wherein the ratio of m to n is at least about 5:1, and wherein ~~ indicates that the distribution of monomeric units can be random. The polyols which can be used also have molecular weights of at least about 1500. The polyols which are preferred contain less than about 10% bound ethylene oxide (have a ratio of m to n of at least about 10:1). Fatty alcohols are a preferred class of nonionic surfactant which can be utilized in the conditioning step. The fatty alcohol utilized will typically be of the structural formula R—OH wherein R represents an alkyl group containing from 5 to 22 carbon atoms. In most cases, R will be an alkyl group containing from 10 to 18 carbon atoms. It is generally preferred for the fatty alcohol to contain from 12 to 14 carbon atoms. For instance, lauryl alcohol is a particularly preferred fatty alcohol. Such fatty alcohols are available commercially from Shell Chemical Company under the tradename NEODOL ®. NEODOL ® 91.6 which has a hydrophile/lipophile balance (HLB) number of 12.5 has been found to be particularly useful.

The nonionic surfactant will typically have a HLB number which is within the range of about 4 to about 18. It is generally preferred for the nonionic surfactant to have a HLB number which is within the range of about 8 to about 16 with HLB numbers within the range of about 10 to about 14 being most preferred. HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures.

Nonionic surfactants which have the structural formula:

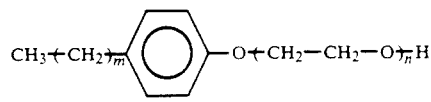

wherein n is an integer from 1 to about 40 and wherein m is an integer from about 6 to about 12 have also been found to be extremely useful. It is normally preferred for m to be 8 or 9. It is most preferred for n to be an integer which is within the range of about 6 to 10. The HLB number of such compounds increases with increasing levels of ethylene oxide incorporation. The HLB number of such compounds increases as a function of n as follows:

| n | HLB Nmber |
|---|---|
| 1 | 3.6 |
| 3 | 7.8 |
| 4 | 10.4 |
| 10 | 13.5 |
| 16 | 15.8 |
| 30 | 17.3 |
| 40 | 17.9 |

Such nonionic surfactants are sold by Rohm and Haas under the tradename TRITON. For example, TRITON X-45, TRITON X-114, and TRITON X-100 are useful. TRITON X-114 has been found to be extremely useful in the conditioning step.

The aqueous solution utilized in the conditioning step will typically contain from about 1 weight percent to about 20 weight percent of the inorganic base. It will preferably contain from about 2 weight percent to about 15 weight percent of the inorganic base. It is normally more preferred for the conditioning medium to contain from about 5 weight percent to about 10 weight percent of the inorganic base.

The aqueous conditioning medium will also contain from about 0.001 weight percent to about 0.5 weight percent of the nonionic surfactant. It is preferred for the aqueous conditioning medium to contain from about 0.005 weight percent to about 0.1 weight percent of the nonionic surfactant. It is most preferred for the aqueous conditioning medium to contain from about 0.01 weight percent to about 0.05 weight percent of the nonionic surfactant.

The time required in the conditioning step is dependent upon the concentration of the inorganic base in the conditioning medium. As a general rule, the time required for conditioning will be within the range of about 1 to 15 minutes. It is preferred for the recycle stream to be conditioned for about 3 to 11 minutes. It is most preferred for the recycle stream to be conditioned for about 5 to 8 minutes. The conditioning step will typically be carried out at a temperature which is at a range of about 5° C. to about 100° C. It is generally convenient for the conditioning step to be conducted at ambient temperature which will normally be at a range of about 15° C. to about 30° C. To properly expose the surfaces of the PET flakes and PVC flakes to the conditioning solution, agitation is normally employed.

After the recycle stream has been conditioned, the mixture of PET flakes and PVC flakes are removed from the aqueous conditioning medium. Then, the treated recycle stream which is comprised of the conditioned PET flakes and conditioned PVC flakes is added to water. It is often desirable for the water to contain a foaming agent. The foaming agent is preferably the nonionic surfactant used in the conditioning step. In practice, the residual nonionic surfactant left on the flakes from the conditioning step could serve this purpose. However, in some cases it will be desirable to add additional foaming agent. The foaming agent will be added in sufficient quantities to maintain a foam on the surface of the water during agitation.

The water is agitated in such a manner that the PVC flakes and PET flakes come in contact with gas bubbles. The gas can be air, nitrogen, oxygen, carbon dioxide, helium, hydrogen, argon, krypton, neon or the like. For economic reasons air is normally utilized as the gas.

The agitation causes gas bubbles to selectively adhere to the PVC flakes without adhering appreciably to the PET flakes. This preference for the gas to adhere to the PVC flakes and not to the PET flakes is a result of the surface modification accomplished in the conditioning step. The attached gas bubbles cause the PVC flakes to rise to the surface of the water with the PET flakes sinking in the water rather than floating. Without the conditioning step, most of the PET flakes and the PVC flakes would float to the surface of the water.

The PVC flakes floating on the water surface can be removed by any number of commercially feasible operations. The PET flakes are, of course, recovered from the bottom of the aqueous mixture. The PET flakes can then be further treated to remove additional contaminants and/or recycled as desired.

This invention is further illustrated by the following examples which are merely for the purpose of illustration and not intended to limit the scope of the present invention or the manner in which it can be practiced. Unless otherwise indicated herein all parts and percentages are given by weight.

EXAMPLE 1

In this experiment PVC flakes were separated from PET flakes by the technique of this invention. In the procedure utilized, a 5 weight percent sodium hydroxide solution was made by mixing 581 grams of water with 30.6 grams of sodium hydroxide. Fifteen drops (0.30 grams) of NEODOL ® 91-6 was added to this solution to make a 0.05 weight percent concentration. The solution was agitated using a standard axial flow turbine agitation system which was run at 1100 rpm until all the sodium hydroxide was dissolved.

A nominal 50/50 PVC/PET flake mixture was added to the conditioning solution. The PVC flakes were obtained by cutting commercially obtained Evian TM water bottles. The PET flakes were obtained by cutting commercially obtained green beverage bottles made from Goodyear Cleartuf ® 84EG.

After 5 minutes of agitated conditioning, the agitator was stopped and the solution was allowed to sit for approximately 2 minutes. The conditioning solution was then decanted from the mixture of the PET flakes and PVC flakes. The PVC/PET flake mixture was rinsed with three nominal 500 ml volumes of water.

This rinsing was accomplished by pouring the first 500 ml volume into the conditioning vessel containing the decanted PET/PVC flakes. The water was then decanted and the procedure repeated for the second 500 ml volume. The third 500 ml volume was used to transfer the PET/PVC flakes from the conditioning vessel to the flotation vessel.

The flotation vessel contained 5,000 ml of water to which 0.5 drops (0.01 grams) of NEODOL ® 91-6 had been added. This was accomplished by adding one drop of NEODOL ® 91.6 to 5,000 ml of water and removing 2,500 ml of water and then adding back 2,500 ml of clean tap water.

The third 500 ml volume of rinse water and the conditioned PET/PVC flakes were added to the flotation vessel. This vessel was a Denver Equipment DR-1 laboratory flotation device. The agitator, which is provided by Denver Equipment, is specially designed to introduce and disperse air or gas bubbles into the aqueous mixture. There are many commercial agitators that accomplish the same objective. In addition, the gas could be added directly such as via a feed line from a compressed gas source.

After the PET/PVC flakes were added to the flotation vessel, the agitator was operated at 1100 rpm. The PVC instantly rose to the top. The PVC was removed by adding a sufficient amount of water to cause the foam with the trapped PVC to overflow the flotation vessel. It was observed at this point that as the water was added, diluting the surfactant concentration in the flotation vessel, the amount of gas bubbles (foam) on the water surface diminished. This can be overcome by recirculating the overflowing water and achieving a steady state surfactant concentration in a continuous process.

The results of the separation are shown below:

|     | Amount Added | Float  | Residue* |
| --- | ------------ | ------ | -------- |
| PET | 7.92 g       | 0.53 g | 7.39 g   |
| PVC | 7.78 g       | 7.59 g | 0.19 g   |

*Sunk to the bottom

The PVC removal efficiency was 97% and the PET recovery was 93%. It should be noted that the PVC flakes which remained in the residue were all larger than 100 mm² in surface area. Thus, PVC removal efficiencies could be improved by better control of flake size.

EXAMPLE 2

In this experiment, the procedure utilized in Example 1 was repeated except that 69.14 grams of sodium hydroxide and 0.13 grams of the TRITON X-114 was added to 691.4 grams of water to make a conditioning solution which contained 10 weight percent sodium hydroxide and 0.25 weight percent TRITON X-114. The conditioning time was 6 minutes at 900 rpm.

The water in the flotation vessel did not contain the half drop of TRITON X-114 utilized in Example 1. Agitation of the flotation vessel was provided as described in Example 1. Most of the PVC separation occurred instantly. However, after adding 4,500 ml of water to the float vessel and subsequently collecting 4,500 ml of overflow, nitrogen was added to the agitator via the special Denver Equipment DR-1 attachment. Even more PVC rose to the surface with gas bubbles attached. Only seven PVC pieces were left in the residue and only two PET pieces were floated off with the PVC.

The results of the separation are shown below:

|     | Amount Added | Float  | Residue* |
| --- | ------------ | ------ | -------- |
| PET | 5.10 g       | 0.05 g | 5.05 g   |
| PVC | 5.23 g       | 4.51 g | 0.72 g   |

*Sunk to the bottom

It should be noted that of the seven PVC flakes in the residue only one was less than 140 mm² in surface area.

EXAMPLE 3

In this experiment the procedure described in Example 1 was repeated except that 29 grams of potassium hydroxide was added to 551 grams of water and 2.5 drops of TRITON X-114 to make a 5 weight percent potassium hydroxide and 0.01 weight percent TRITON X-114 solution. The PET/PVC flakes were conditioned at 900 rpm for 5 minutes before the agitator was stopped. The conditioned PVC/PET flakes were decanted and rinsed with three 500 ml volumes of water with the third volume being added to the flotation vessel.

The PVC floated immediately when the agitator was started. While the flotation vessel did not have any TRITON X-114 intentionally added, it was apparent from the amount and size of the bubbles that there was a high level of residual nonionic surfactant remaining on the flakes. This confirmed the preference of having some level of foaming agent in the flotation vessel.

The results of the separation are shown below:

|     | Amount Added | Float  | Residue* |
| --- | ------------ | ------ | -------- |
| PET | 4.33 g       | 0.04 g | 4.29 g   |
| PVC | 3.72 g       | 3.42 g | 0.30 g   |

*Sunk to the bottom

EXAMPLE 4

In this example, the conditioning solution preparation was the same as described in Example 1, except that 29 grams of potassium hydroxide and 3 drops of TRITON-X 114 was added to 546 grams of water to make a 5 weight percent potassium hydroxide and 0.013 weight percent TRITON-X 114 solution.

The flotation water was prepared as described in Example 1. The difference between this example and the previous examples is that the PVC/PET which was carried over in the float was subjected to a separate separation using the overflowed water.

The PET/PVC flakes were conditioned for 5 minutes at 1100 rpm. The agitator was stopped and the PVC/PET flake mixture decanted and rinsed with 3 volumes of 500 ml of water as described in Example 1.

The results of the separation are shown below:

|     | Amount Added | Float | Residue* |
| --- | ------------ | ----- | -------- |
| Float Separation Number 1 | | | |
| PET | 12.96 g | 5.20 g | 7.76 g |
| PVC | 12.80 g | 12.24 g | 0.56 g |
| Float Separation Number 2 | | | |
| PET | 5.20 g | 0.42 g | 4.78 g |
| PVC | 12.24 g | 11.98 g | 0.26 g |
| Combined Results of the Two Stage Flotations | | | |
| PET | 12.96 g | 0.42 g | 12.54 g |
| PVC | 12.80 g | 11.98 g | 0.82 g |

*Sunk to the bottom

This two stage system had a 97% PET recovery and a 94% PVC removal efficiency. It is, of course, possible to attain even higher levels of efficiency by utilizing multiple stage flotation procedures which entail three or more flotation steps.

EXAMPLE 5

In this experiment PVC flakes were separated from PET flakes by the technique of this invention. In the procedure utilized, a 10 weight percent sodium hydroxide solution was made by mixing 624 grams of water with 68 grams of sodium hydroxide. The solution was agitated using a standard axial flow turbine agitation system which was run at 900 rpm until all the sodium hydroxide was dissolved.

A nominal 50/50 PVC/PET flake mixture was added to the washing solution. The PVC flakes were obtained by cutting commercially obtained Evian TM water bottles. The PET flakes were obtained by cutting commercially obtained green beverage bottles made from Goodyear Cleartuf ® 84EG.

After 10 minutes of agitated washing, the washing solution was then decanted from the mixture of the PET flakes and PVC flakes. The washed PET/PVC mixture was then added to the conditioning/flotation vessel.

The conditioning/flotation vessel contained 5,000 ml of water to which 0.00012 weight percent TRITON X-114 had been added. This was accomplished by adding one drop (0.024 grams) of TRITON X-114 to 5,000 ml of water and removing 2,500 ml of water and then adding back 2,500 ml of clean tap water. This step was repeated one more time.

This vessel was a Denver Equipment DR-12 laboratory flotation device. The agitator, which is provided by Denver Equipment, is specially designed to introduce and disperse air or gas bubbles into the aqueous mixture when a valve is opened. There are many commercial agitators that accomplish the same objective. In addition, the gas could be added directly such as via a feed line from a compressed gas source.

The washed PET/PVC was conditioned in the flotation vessel containing the aqueous solution, TRITON X-114 and washed PET/PVC flakes by operating the agitator with the air valve closed for 10 minutes at 900 rpm. After 10 minutes, the air valve was opened to allow air to disperse into the solution and form bubbles. Further separation was obtained by adding nitrogen as described in Example 2. The PVC instantly rose to the top.

The results of the separation are shown below:

|  | Amount Added | Float | Residue* |
| --- | --- | --- | --- |
| PET | 1.27 g | 0.00 g | 1.24 g |
| PVC | 2.10 g | 1.54 g | 0.66 g |

*Sunk to the bottom

The PVC removal efficiency was 70% and the PET recovery was 100%.

Variations in the present invention are possible in light of the descriptions of it provided herein. It is, therefore, to be understood that changes can be made in the particular embodiments described which will be within the full intended scope of the invention as defined by the following appended claims.

What is claimed is:

1. A process for recovering polyethylene terephthalate flakes from a recycle stream containing polyethylene terephthalate flakes and polyvinyl chloride flakes which comprises: (1) washing the recycle stream with an aqueous solution of at least one base; (2) recovering the washed recycle stream from the aqueous solution; (3) treating the recovered recycle stream with at least one nonionic surfactant under conditions and for a time sufficient to decrease the contact angle of the polyethylene terephthalate flakes below a value of 25° while maintaining the contact angle of the polyvinyl chloride flakes above a value of about 45° to form an aqueous mixture containing the treated polyethylene terephthalate flakes and treated polyvinyl chloride flakes; (4) agitating the aqueous mixture to allow the polyvinyl chloride flakes to come in contact with air; (5) allowing the polyvinyl chloride flakes to float to the surface of the aqueous mixture and allowing the polyethylene terephthalate flakes to sink to the bottom of the aqueous mixture; and (6) removing the polyvinyl chloride flakes from the surface of the aqueous mixture and removing the polyethylene terephthalate flakes from the bottom of the aqueous mixture.

2. A process as specified in claim 1 wherein the nonionic surfactant is a fatty alcohol.

3. A process as specified in claim 2 wherein the fatty alcohol contains from 10 to 18 carbon atoms.

4. A process as specified in claim 2 wherein the fatty alcohol contains from 12 to 14 carbon atoms.

5. A process as specified in claim 1 wherein the nonionic surfactant has a HLB number which is within the range of about 8 to about 16.

6. A process as specified in claim 1 wherein the nonionic surfactant has a HLB number which is within the range of about 10 to about 14.

7. A process as specified in claim 1 wherein the nonionic surfactant has a structural formula:

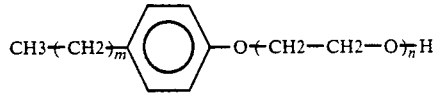

wherein n is an integer which is within the range of 1 to 40 and wherein m is an integer which is within the range of 6 to 12.

8. A process as specified in claim 7 wherein n is an integer which is within the range of 6 to 10 and wherein m is 8 or 9.

9. A process as specified in claim 1 wherein the recycle stream is washed in step (1) with an aqueous solution which contains from about 2 to about 15 weight percent of the base.

10. A process as specified in claim 9 wherein from about 5 to about 10 weight percent of the base is present.

11. A process as specified in claim 1 wherein the gas is air.

12. A process as specified in claim 1 wherein the contact angle of the PET flakes is reduced to a value of below about 15° and wherein the contact angle of the PVC flakes is increased to a value of above about 50°.

13. A process as specified in claim 1 wherein the contact angle of the PET flakes is reduced to a value of below about 5° and wherein the contact angle of the PVC flakes is increased to a value of above about 55°.

14. A process as specified in claim 1 wherein the gas is nitrogen.

15. A process as specified in claim 1 wherein the inorganic base is sodium hydroxide.

16. A process as specified in claim 1 wherein the inorganic base is potassium hydroxide.

17. A process as specified in claim 1 wherein the nonionic surfactant is a polyol which is a copolymer of ethylene oxide and propylene oxide.

18. A process as specified in claim 1 wherein the base is an inorganic base.

* * * * *